F. P. FREEMAN.
PRESSURE DROP ALARM FOR TIRES.
APPLICATION FILED MAY 5, 1914.
1,144,834.
Patented June 29, 1915.
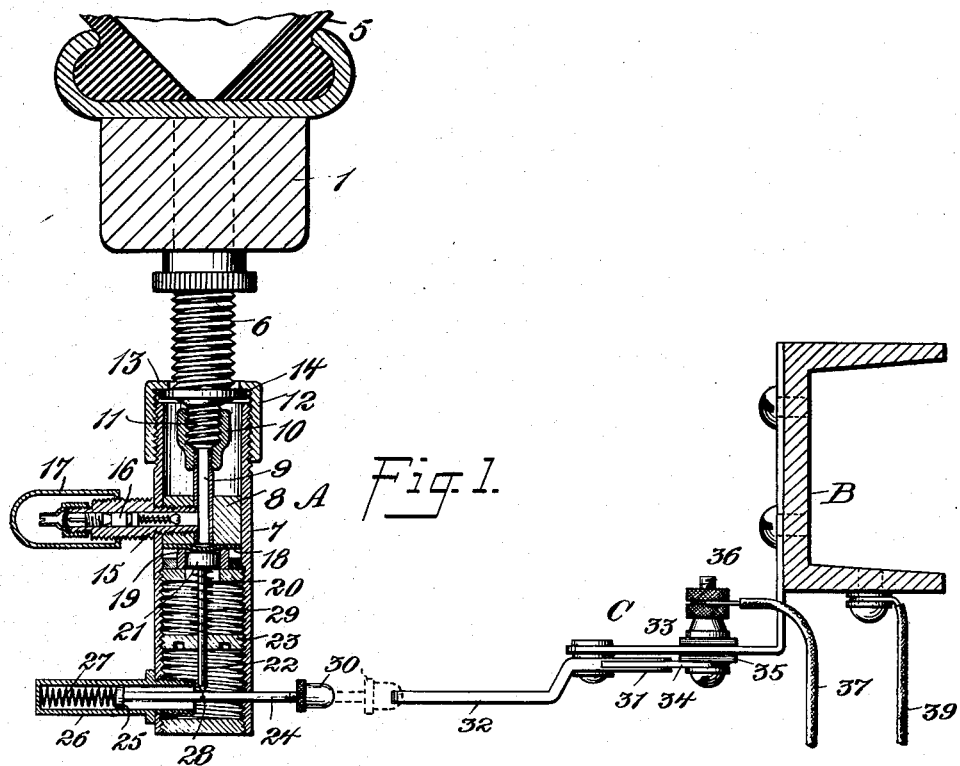

UNITED STATES PATENT OFFICE.

FRED PRENTISS FREEMAN, OF RICHLAND, WASHINGTON.

PRESSURE-DROP ALARM FOR TIRES.

1,144,834.  Specification of Letters Patent.  Patented June 29, 1915.

Application filed May 5, 1914. Serial No. 836,429.

*To all whom it may concern:*

Be it known that I, FRED P. FREEMAN, a citizen of the United States, and a resident of Richland, in the county of Benton and State of Washington, have invented a new and Improved Pressure-Drop Alarm for Tires, of which the following is a full, clear, and exact description.

This invention relates to an indicating or alarm system for use in connection with vehicles having pneumatic tires whereby the pressure drop in any tire will be immediately indicated, as well as the location of the particular tire.

The invention has for its general objects to provide an automatic alarm or indicating means of the character referred to which is comparatively inexpensive to manufacture and install, thoroughly reliable and efficient in use and so designed as to be easily and conveniently controlled and manipulated.

A further object of the invention is the provision of an electric annunciator or drop for each tire which is connected with a source of current, and associated with each tire is a pressure responsive device which is released when the pressure drops to a certain point, whereby a switch is closed so that current will energize that annunciator provided for the particular tire in which the pressure has dropped, there being a bell or other alarm also included in circuit so as to warn the driver of the fact of the drop in pressure, and by means of the annunciators he can ascertain at a glance which is the tire that needs repairing or inflating.

A further object of the invention is the provision of a novel form of pressure-controlled trip which is applied to the valve stem of each tire and includes means whereby the tire can be easily and conveniently inflated, there being associated with each trip and mounted on the vehicle body a switch, so that when the trip is released by drop in tire pressure the trip will operate its associated switch and energize the annunciator and bell.

With such objects in view, and others which will appear as the description proceeds, the invention comprises various novel features of construction and arrangement of parts such as will be set forth with particularity in the following description and claims appended hereto.

In the accompanying drawings, which illustrate one embodiment of the invention, and wherein similar characters of reference indicate corresponding parts in all the views, Figure 1 is a perspective view of a combined tire inflating device and pressure-controlled trip and circuit closer or switch associated with the trip; Fig. 2 is a plan view of the circuit closer or switch; and Fig. 3 is a diagrammatic view of the electric circuits, together with the wheel carried trips for the switches of the circuits.

Referring to the drawings, and particularly to Fig. 3, 1, 2, 3 and 4 designate the four wheels of a vehicle, which wheels are each shod with a pneumatic tire 5 that are supplied with air through an inflating stem 6, and applied to each stem is a combined inflating device and pressure controlled trip designated generally by A, the details of which are shown in Fig. 1. This device A consists of a tubular casing 7 which has fixed within it at a point somewhat below the upper end a plug 8 which carries a tube 9, there being on the upper end of the tube an internally-threaded socket 10 which screws onto a threaded nipple 11 on the extremity of the tire stem 6. The casing 7 is externally threaded at its upper end and receives a jam nut 12 that is formed with an internal flange 13 which engages a shoulder formed by a flange 14 carried by the stem 6. By unscrewing the nut 12 the device A can be detached from the stem 6 by turning the device as a whole to unscrew the sockets 10 therein from the nipple 11, and of course the attachment of the device to the tire stem is effected in a reverse manner. Extending laterally from the casing is means for connection with an air pump or other inflating means. This attaching means includes a tubular body 15 which screws into the casing 7 and plug 8 to communicate with the pipe 9 in the latter, said body 15 having a self-seating valve 16 such as is commonly used in valve stems of pneumatic tires, and applied to this tubular member 15 is a protecting cap 17. Under the plug 8 is a metal or other diaphragm 18 which has its upper side exposed to the pressure in the tube or pipe 9, which pressure is the same as that in the tire. The diaphragm is clamped in place by means of a ring 19 and a disk 20 which screws into the lower end of the casing 7 and holds the ring 9 tightly against the diaphragm. The part of the diaphragm lying over the opening in the ring is capable of yielding downwardly and it operates on the head or plunger 21 of a trigger pin 22, such pin being movable in a guide formed by a disk 23 which is screwed in the casing 7. The trigger 22 is adapted normally to hold in retracted position a longitudinally movable trip 24 which extends transversely to and is slidable in the lower end of the cylinder 7. The trip has a plunger 25 carried by one end, which plunger is slidable in a cylinder or guide 26 screwed into the side of the casing 7, there being interposed between the plunger 25 and the closed outer end of the guide or cylinder 26, a helical compression spring 27, which, when the trigger is released from the trip, expands and throws the trip outwardly. The trip has a shoulder, groove or equivalent means 28 with which the lower end of the trigger 22 is adapted to normally engage while pressure in the tire is maintained above a certain point. A spring 29 is provided on the trigger 22 between the head or piston 21 thereof and the guide 23, and the tension of this spring is such that the trigger is adapted to be raised out of engagement with the trip 24 when the diaphragm 27 moves upwardly by the diminution of pressure in the tire. By adjusting the guide or disk 23 the tension may be varied. The outer end of the trip carries an adjustable striking element 30, which, when the trip is released, assumes a position where, as the wheel rotates, it will operate a circuit closer and thereby close an indicator and alarm circuit so that the driver will be informed that a tire has lost its pressure and needs attention.

Associated with each wheel and mounted on the vehicle body, which latter is designated by B, Fig. 1, is a switch or circuit closer C. This circuit closer in the present instance is shown as a pivoted contact 31 which has an extension or arm 32 that is disposed in the path of the trip 24 so as to be struck by the element 30 thereof when the trip is released and projected. Coöperating with the contact 31, which is pivoted on a bracket or other support 33, is a pair of spring contact fingers or members 34 which are fastened to but insulated from the bracket 33 by insulation 35. Normally the contact 30 is out of engagement with either contact element 34, and when the arm 32 is struck by the trip the circuit is closed by the contact 31 engaging either one of the contacts 34. The contacts 34 are electrically connected with a binding post 36 which has connected therewith a circuit wire 37. The circuit wires 37 from the switches C, associated with the wheels 1, 2, 3 and 4. are connected respectively with annunciators 4ª, 3ª, 2ª and 1ª, such annunciators being arranged in any suitable manner and preferably disposed in convenient view of the driver, as for instance on the dash 38 of the vehicle. The contact 31 is grounded on the bracket 33, which in turn is grounded on the vehicle frame, and a wire 39 connects such vehicle frame with one terminal of a source of current 40, the other terminal being connected by a wire 41, bell 42 and wire 43 with the common wire 44 of the annunciator. The cut-out switch 45 may be included in the circuit so as to enable the circuit to be thrown open when the vehicle is in a garage, so as to prevent, in case of pressure falling in any tire, the circuit from being closed and wasting current. When in operation any tire loses its pressure the trigger device thereof is released so that the switch associated with such tire will be closed and the annunciator for such tire will be energized so that the driver will know which tire needs attention, the signal or alarm 42 serving first to attract attention to the condition of the tires. The circuit closer or switch C is of such design that it remains in closed position after having been once actuated, and therefore the driver must reset the switch manually.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. The combination of a wheel, a tire thereon, an inflating stem for the tire, a combined inflating device and pressure responsive means attached to the stem, a trip carried by the said means and controlled by the pressure responsive device, means for moving the trip when the said device loses control of the trip by the fall of pressure in the tire, a switch adapted to be closed by said trip when the same is released, and an alarm circuit controlled by the switch.

2. The combination of the inflating stem of a tire and a device connected therewith, said device including a valve-controlled inlet through which the tire is inflated, a diaphragm in the device and responsive to the pressure in the tire, a trigger controlled by the diaphragm, and a spring-pressed trip held set by the trigger.

3. The combination of a tire inflating stem, a casing, means for fastening the casing to the stem, a tube in the casing and communicating with the stem, an inflating means communicating with the tube, a pressure responsive device in the casing and subjected to the pressure in the tube, a trip carried by the casing and tending to move to signaling position, and means controlled by the pressure responsive device for releasably holding the trip in non-signaling position.

4. The combination of a tire inflating stem, a casing, means for fastening the casing to the stem, a tube in the casing and communicating with the stem, an inflating means communicating with the tube, a diaphragm in the casing and responsive to the pressure in the tube, a spring-pressed trigger operatively related to the diaphragm, and a trip normally engaged by the trigger and adapted to operate when the trigger releases by the fall in pressure on the diaphragm.

5. The combination of a tire inflating stem, a casing, means for fastening the casing to the stem, a tube in the casing and communicating with the stem, an inflating means communicating with the tube, a diaphragm in the casing and responsive to the pressure in the tube, a spring-pressed trigger operatively related to the diaphragm, a trip mounted in one end of the casing and extending transversely thereto and with which the trigger normally engages, and a spring acting on the trip for moving the same when the trigger is released.

In testimony whereof I have signed my name to this specification in the presence of two subscribing witnesses.

FRED PRENTISS FREEMAN.

Witnesses:
A. G. FARLEY,
W. F. MORRIS.